United States Patent
Stuart

(10) Patent No.: US 10,247,136 B2
(45) Date of Patent: Apr. 2, 2019

(54) THRUST REVERSER SYSTEM FOR A GAS TURBINE ENGINE

(71) Applicant: General Electric Company, Schenectady, NY (US)

(72) Inventor: Alan Roy Stuart, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 565 days.

(21) Appl. No.: 14/957,908

(22) Filed: Dec. 3, 2015

(65) Prior Publication Data

US 2017/0159606 A1    Jun. 8, 2017

(51) Int. Cl.
| F02K 1/70 | (2006.01) |
|---|---|
| F02K 1/72 | (2006.01) |
| F02K 3/06 | (2006.01) |
| F01D 25/24 | (2006.01) |

(52) U.S. Cl.
CPC ............... *F02K 1/70* (2013.01); *F01D 25/24* (2013.01); *F02K 1/72* (2013.01); *F02K 3/06* (2013.01); *F05D 2220/323* (2013.01); *F05D 2230/60* (2013.01); *Y02T 50/672* (2013.01)

(58) Field of Classification Search
CPC ..... F02K 1/72; F02K 1/70; F02K 1/62; F02K 1/625
See application file for complete search history.

(56) References Cited

U.S. PATENT DOCUMENTS

| 3,824,784 A | 7/1974 | Kitson et al. |
|---|---|---|
| 5,794,434 A | 8/1998 | Szupkay |
| 6,170,253 B1 | 1/2001 | Newton |
| 6,845,946 B2 | 1/2005 | Lair |
| 6,895,742 B2 | 5/2005 | Lair et al. |
| 7,484,356 B1 | 2/2009 | Lair |
| 8,720,183 B2 | 5/2014 | Welch et al. |

(Continued)

FOREIGN PATENT DOCUMENTS

| DE | 10 2013 206595 A1 | 10/2014 |
|---|---|---|
| EP | 2 837 810 A1 | 2/2015 |

(Continued)

OTHER PUBLICATIONS

Extended European Search Report and Opinion issued in connection with corresponding EP Application No. 16199963.6 dated Apr. 5, 2017.

(Continued)

*Primary Examiner* — Andrew H Nguyen
(74) *Attorney, Agent, or Firm* — General Electric Company; Pamela Kachur

(57) ABSTRACT

A thrust reverser system for incorporation into a nacelle assembly of a gas turbine engine includes a frame member and a forward ring movable along an axial centerline relative to the frame member. The forward ring is movable between a first position and the second position. The thrust reverser system additionally includes a cascade segment slidably attached to the frame member and rotatably attached to the forward ring. When the forward ring is in the first position the cascade segment is in a radially outer position, and when the forward ring is in the second position, the cascade segment is in a radially inner position for changing a direction of a flow of air to generate reverse thrust.

20 Claims, 9 Drawing Sheets

(56) References Cited

U.S. PATENT DOCUMENTS

| | | | |
|---|---|---|---|
| 9,016,040 B2 | 4/2015 | Stuart et al. | |
| 2013/0092755 A1* | 4/2013 | Aten | F02K 1/72 |
| | | | 239/265.33 |
| 2013/0202402 A1 | 8/2013 | Stuart et al. | |
| 2013/0318945 A1 | 12/2013 | Todorovic | |
| 2014/0150404 A1* | 6/2014 | Gallet | F02K 1/70 |
| | | | 60/226.2 |
| 2014/0353399 A1 | 12/2014 | Stuart et al. | |
| 2015/0121895 A1 | 5/2015 | Suciu et al. | |
| 2015/0122904 A1 | 5/2015 | Burghdoff et al. | |
| 2015/0226157 A1* | 8/2015 | Calder | B33Y 80/00 |
| | | | 60/228 |

FOREIGN PATENT DOCUMENTS

| | | | | |
|---|---|---|---|---|
| FR | 3016006 | * | 3/2015 | F02K 1/72 |
| FR | 3 016 006 A1 | | 7/2015 | |
| GB | 1142660 | * | 2/1969 | F02K 1/04 |
| JP | 44-023685 B2 | | 10/1969 | |
| JP | 2013-231432 A | | 11/2013 | |
| WO | 2015/101758 A1 | | 7/2015 | |

OTHER PUBLICATIONS

Machine Translation and Notification of Reasons for Refusal issued in connection with corresponding JP Application No. 2016-224952 dated Dec. 19, 2017.

Machine Translation and First Office Action and Search issued in connection with corresponding CN Application No. 201810194264.3 dated Jan. 2, 2018.

\* cited by examiner

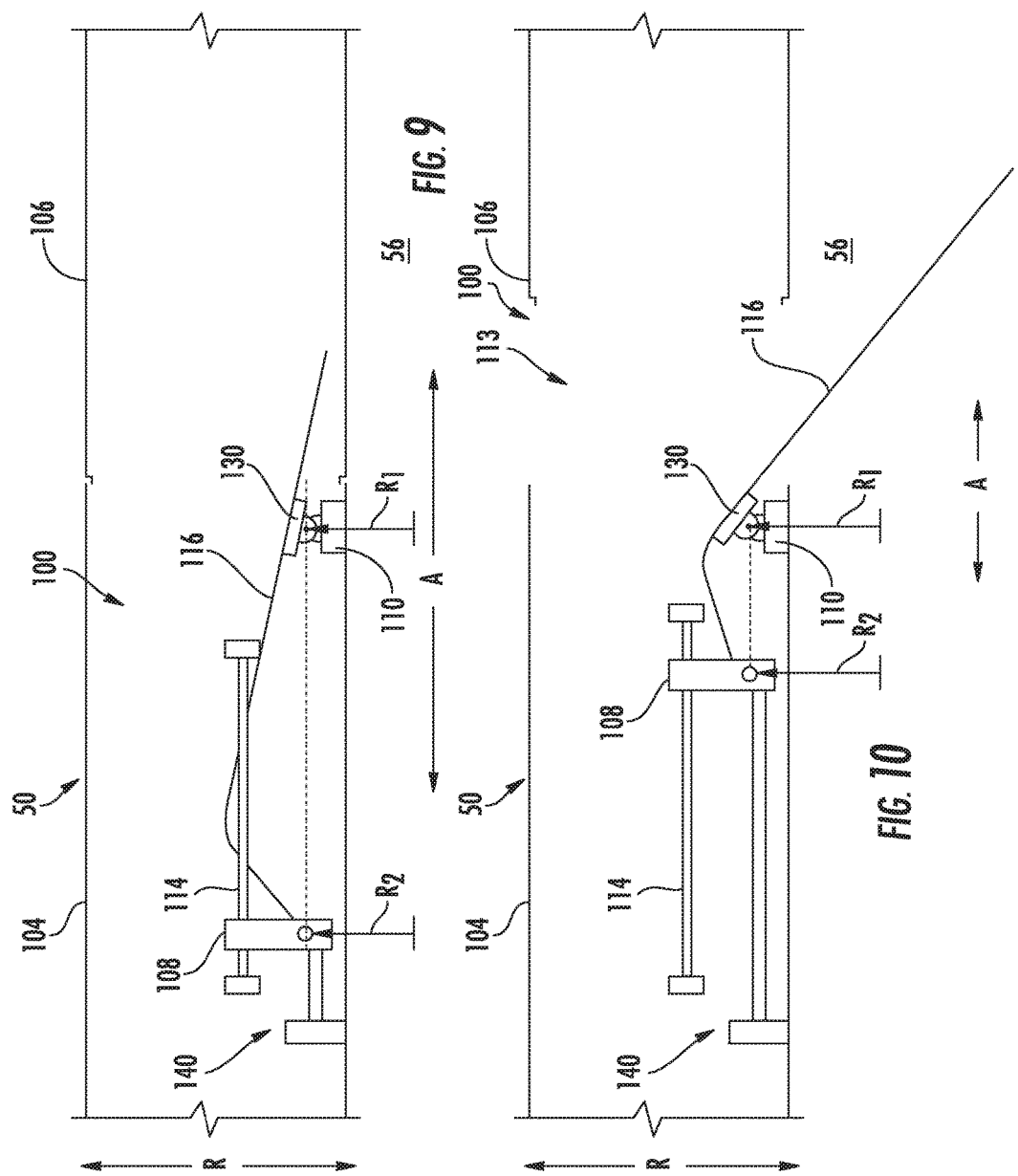

THRUST REVERSER SYSTEM FOR A GAS TURBINE ENGINE

FIELD OF THE INVENTION

The present subject matter relates generally to a gas turbine engine having a cascade thrust reverser system.

BACKGROUND OF THE INVENTION

Turbofan engines generally include a fan and a core arranged in flow communication with one another. A first portion of air over the fan may flow past the core through a bypass passage (defined between the core and an outer nacelle assembly) and a second portion of air over the fan may be provided to the core.

The core of the turbofan engine generally includes, in serial flow order, a compressor section, a combustion section, a turbine section, and an exhaust section. In operation, the air provided to the core flows through the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

For at least certain gas turbine engines, the nacelle assembly includes a thrust reverser system. Typical thrust reverser systems include a translating cowl ("tanscowl"), a cascade mounted within the nacelle assembly, and blocker doors movable between a stowed position and a deployed position. The cascade is typically a fixed structure, whereas the transcowl is adapted to be translated aft to expose the cascade and deploy the blocker doors into the bypass passage. When the thrust reverser system is not in use, the blocker doors may cover the cascade. By contrast, when the thrust reverser system is in use, the blocker doors extend into the bypass passage, blocking an airflow through the bypass passage, and forcing such airflow through the cascade. The cascade may then change a flow direction of an airflow therethrough to generate a reverse thrust. However, such a configuration may negatively affect the airflow through the bypass passage, as the blocker doors may be exposed to such airflow when stowed. Alternatively, the blocker doors may be enclosed within the nacelle assembly when stowed, however such may result in a larger than desired nacelle assembly.

Accordingly, certain thrust reverser systems have been developed that do not require blocker doors. Such thrust reverser systems may instead translate the cascades into the bypass passage using a plurality of drag links. However, the drag links of such thrust reverser systems still extend through the bypass passage even when the system is stowed.

Thus, a thrust reverser system for a gas turbine engine that does not require blocker doors or drag links extending into and/or through a bypass passage would be useful. More particularly, a thrust reverser system for a gas turbine engine including a deployment means that does not interfere with an airflow through the bypass passage would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine is provided. The gas turbine engine defines an axial centerline and includes a core in flow communication with a fan. The gas turbine engine also includes a nacelle assembly enclosing the fan and at least a portion of the core to define a bypass passage with the core. The nacelle assembly includes a thrust reverser system. The thrust reverser system includes a frame member, a forward ring movable along the axial centerline relative to the frame member between a first position and a second position, and a cascade segment. The cascade segment is slidably attached to the frame member and rotatably attached to the forward ring such that when the forward ring is in the first position the cascade segment is positioned outside the bypass passage and when the forward ring is in the second position the cascade segment is positioned at least partially within the bypass passage.

In another exemplary embodiment of the present disclosure, a thrust reverser system for incorporation into a nacelle assembly for a gas turbine engine is provided. The thrust reverser system includes a frame member, a forward ring movable along an axial centerline relative to the frame member between a first position and a second position, and a cascade segment. The cascade segment is slidably attached to the frame member and rotatably attached to the forward ring such that when the forward ring is in the first position the cascade segment is in a radially outer position and when the forward ring is in the second position the cascade segment is in a radially inner position.

In an exemplary aspect of the present disclosure, a method of manufacturing a cascade segment of a thrust reverser system for incorporation into a nacelle assembly of a gas turbine engine is provided. The method includes providing a multi-piece individual cascade framing tool, and wrapping the multi-piece individual cascade framing tool in multiple layers of a composite fabric material. The method also includes resin impregnating the multiple layers of composite fabric material wrapped around the multi-piece individual cascade framing tool, and curing the resin impregnated layers of composite fabric material wrapped around the multi-piece individual cascade framing tool to form an individual cascade member of the cascade segment. The method also includes removing the multi-piece individual cascade framing tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 is a simplified, side, schematic view of a thrust reverser system in accordance with another exemplary embodiment of the present disclosure in a fully stowed position.

FIG. 10 is a simplified, side, schematic view of the exemplary thrust reverser system of FIG. 9 in a fully deployed position.

DETAILED DESCRIPTION OF THE INVENTION

Figure 1:
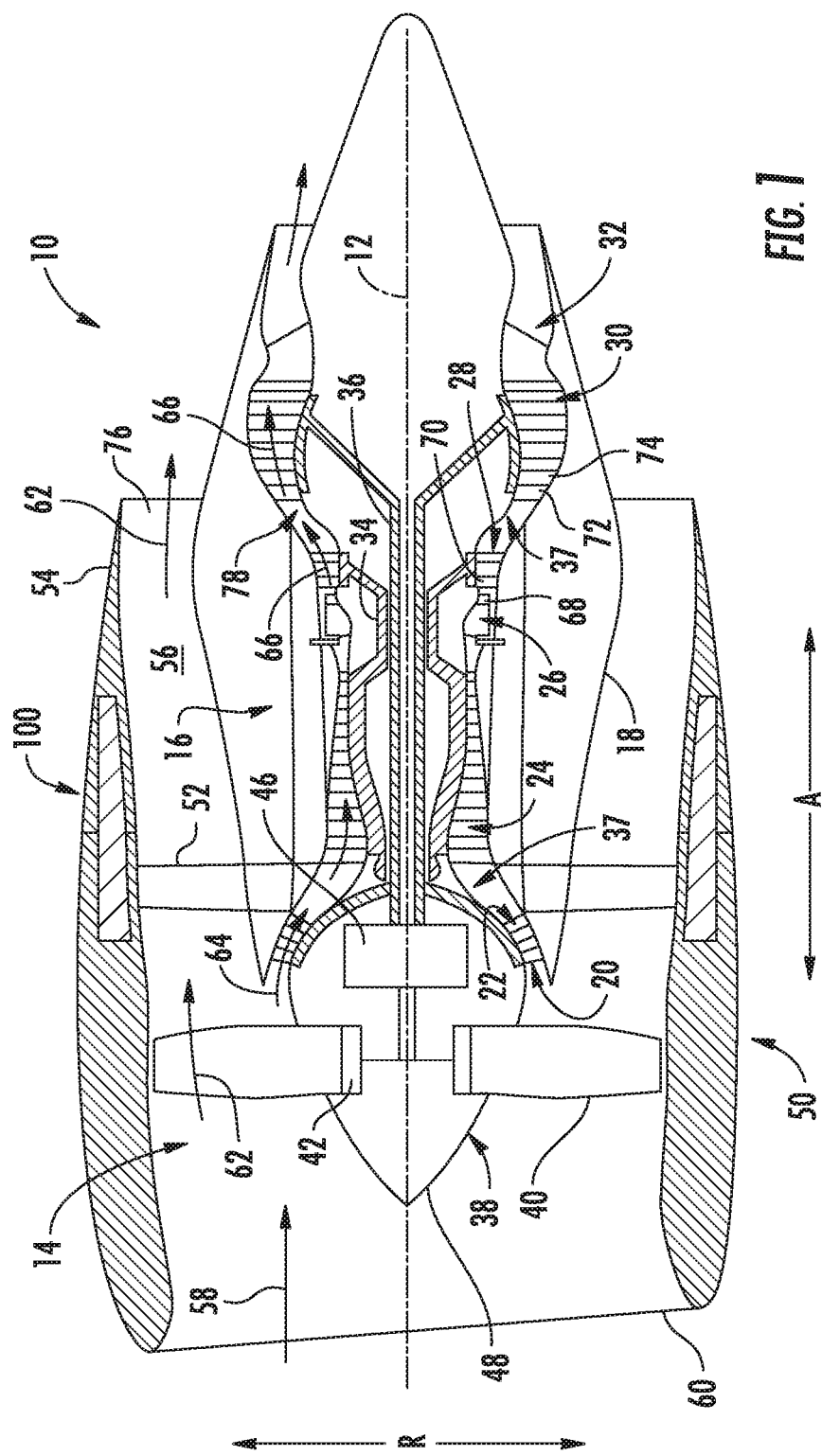
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 may also define a circumferential direction (not shown) extending circumferentially about the axial direction A. In general, the turbofan 10 includes a fan section 14 and a core turbine engine 16 disposed downstream from the fan section 14.

The exemplary core turbine engine 16 depicted is generally enclosed within a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are rotatable about the longitudinal axis 12 by LP shaft 36 across a power gear box 46, for the embodiment depicted. The power gear box 46 includes a plurality of gears for stepping down the rotational speed of the LP shaft 36 to a more efficient rotational fan speed.

Referring still to the exemplary embodiment of FIG. 1, a disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the core turbine engine 16. It should be appreciated that the nacelle assembly 50 (including a fan case located inward of a fan cowl 104, see FIGS. 2 and 3) may be configured to be supported relative to the core turbine engine 16 by a plurality of circumferentially-spaced outlet guide vanes 52. Moreover, a downstream section 54 of the nacelle assembly 50 may extend over an outer portion of the casing 18 so as to define a bypass airflow passage 56 therebetween. As will be discussed in greater detail with reference to the exemplary embodiments below, the nacelle assembly 50 includes a thrust reverser system 100, which is depicted in a fully stowed position.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24. The second portion of air 64 then flows into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools.

Figure 2:
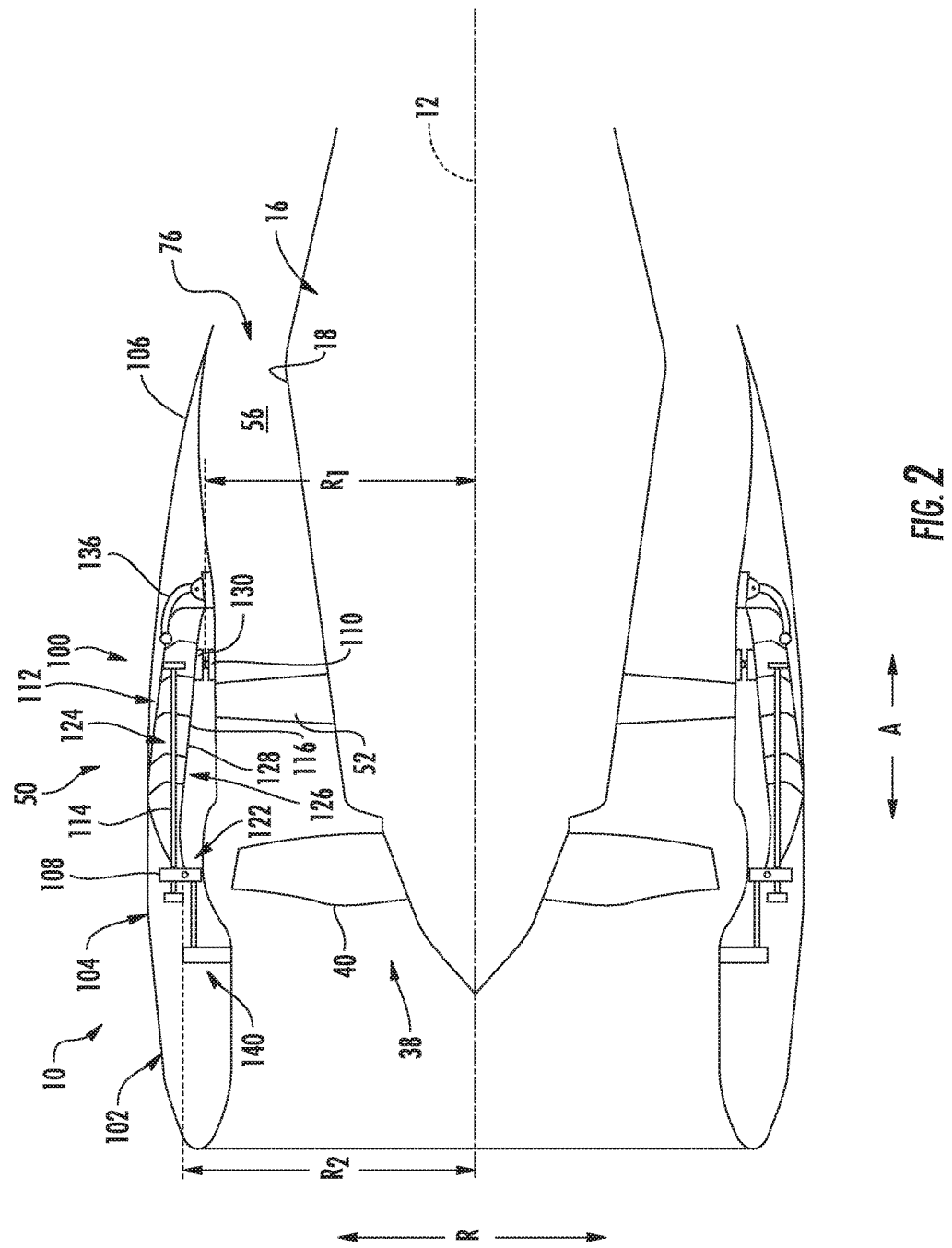
FIG. 2 is an axial, side, sectional view of the exemplary turbofan engine of FIG. 2 depicting a thrust reverser system in accordance with an exemplary aspect of the present disclosure in a fully stowed position.
Figure 3:
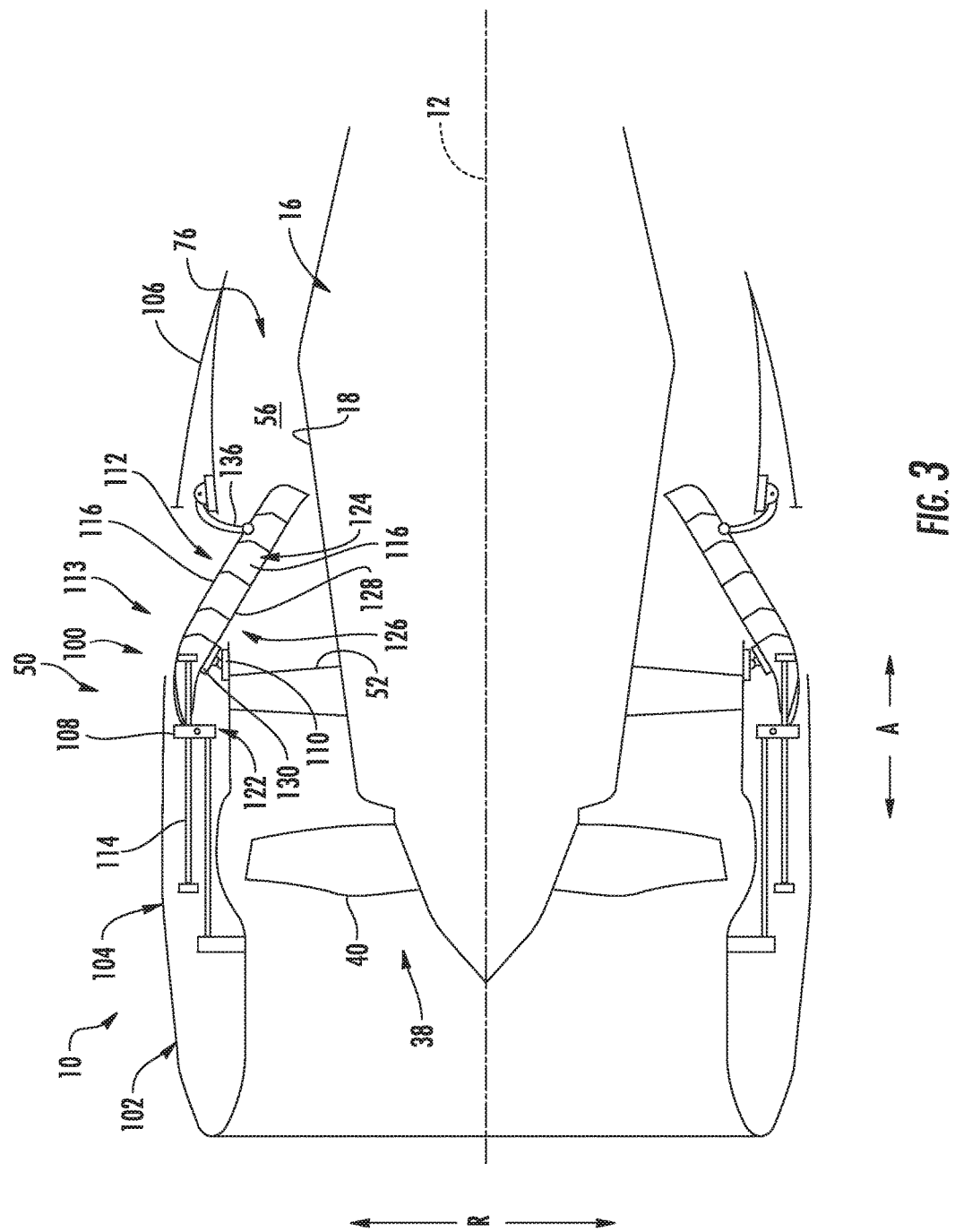
FIG. 3 is an axial, side, sectional view of the exemplary turbofan engine of FIG. 2 depicting the thrust reverser system in a fully deployed position.

Referring now to FIGS. 2 and 3, cross-sectional, schematic views of the exemplary turbofan engine 10 and exemplary thrust reverser system 100 of FIG. 1 are provided. Specifically, FIG. 2 provides a cross-sectional, schematic view of the exemplary turbofan engine 10 depicting the thrust reverser system 100 in a fully stowed position, and FIG. 3 provides a cross-sectional, schematic view of the exemplary turbofan engine 10 depicting the thrust reverser system 100 in a fully deployed position.

As is depicted, the nacelle assembly 50 of the turbofan engine 10 generally includes an inlet assembly 102, a fan cowl 104, and the thrust reverser system 100. The inlet assembly 102 is positioned at a forward end of the nacelle assembly 50, and the fan cowl 104 is positioned aft of the inlet assembly 102 and at least partially surrounds the fan 38. The thrust reverser system 100 is, in turn, positioned at least partially aft the fan cowl 104. As is depicted, the outer casing 18 of the core 16 defines a radially inward boundary of a bypass passage 56 and the nacelle assembly 50 defines a radially outward boundary of the bypass passage 56. Bypass air of the turbofan engine 10 passes through the bypass passage 56 and exits through the fan exit nozzle 76 during certain operations.

The thrust reverser system 100 generally includes a translating cowl (transcowl) 106 that is slidable relative to the fan cowl 104, a forward ring 108, a frame member 110, and a cascade system 112. The transcowl 106 is the aft-most section of the nacelle assembly 50, located aft of the fan cowl 104 and circumscribing the outer casing 18 of the core 16. When in the fully stowed position, as shown, the cascade system 112 is stowed at least partially within the fan cowl 104, and the transcowl 106 is positioned adjacent to the fan cowl 104. By contrast, when in the fully deployed position, the cascade system 112 is positioned at least partially in the bypass passage 56, and the transcowl 106 is positioned away from the fan cowl 104, defining an opening 113 therebetween.

The forward ring 108 is annular shaped and may be self-centering in combination with a plurality of actuator assemblies 140 and the cascade system 112. Additionally, or alternatively, for the embodiment depicted the forward ring 108 is slidable along a plurality of axially extending tracks of the thrust reverser system 100. The axially extending tracks are, for the embodiment depicted, configured as a plurality of circumferentially spaced and axially extending rods 114. The rods 114 are fixed within the nacelle assembly 50 for guiding the forward ring 108. Additionally, for the embodiment depicted, the forward ring 108 is positioned forward of the cascade system 112, which is made up of a plurality of individual cascade segments 116. As will be explained in greater detail below, when the thrust reverser system 100 is in the fully stowed position (FIG. 2), the cascade segments 116 are completely enclosed within the fan cowl 104 and transcowl 106. By contrast, when the thrust reverser system 100 is in the fully deployed position (FIG. 3), the cascade segments 116 extend substantially across a radial width of the bypass passage 56 and redirect an airflow from the bypass passage 56 through the opening 113 to generate reverse thrust. Moreover, as the cascade system 112 is stowed at least partially within the fan cowl 104 when in the fully stowed position (and slides/translates into the deployed position), inclusion of the cascade system 112 may not add to an overall axial length of the nacelle assembly 50.

Further, the frame member 110 may be a distinct ring attached to a fan case located inward of the fan cowl 104, as shown, or alternatively may include a plurality of individual frame member segments attached to the fan case located inward of the fan cowl 104 (or integrated into the fan case located inward of the fan cowl 104). Accordingly, for the embodiment depicted the frame member 110 is stationary relative to the fan cowl 104.

Figure 4:
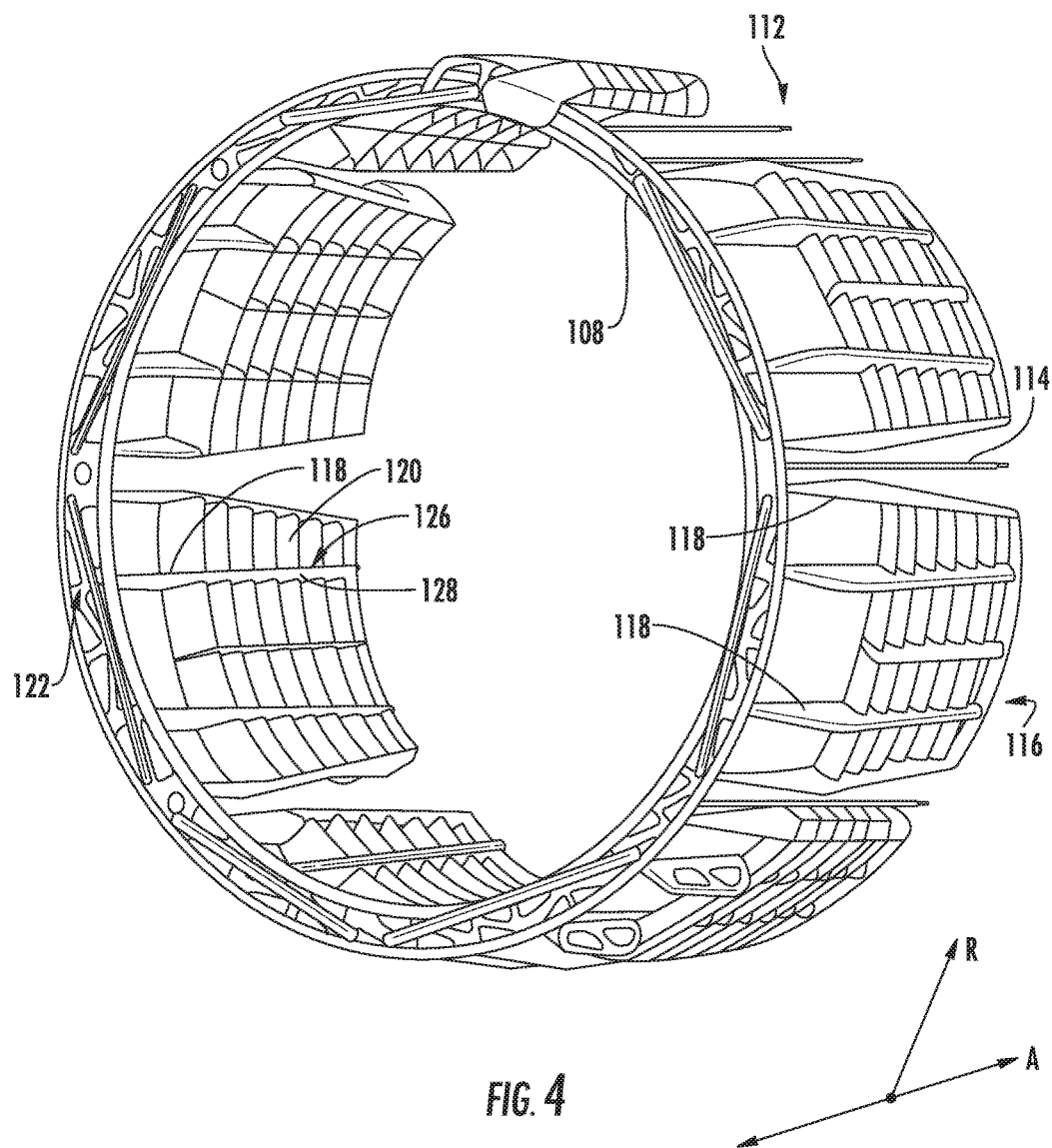
FIG. 4 is a perspective view of certain components of the exemplary thrust reverser system of FIG. 2.
Figure 5:
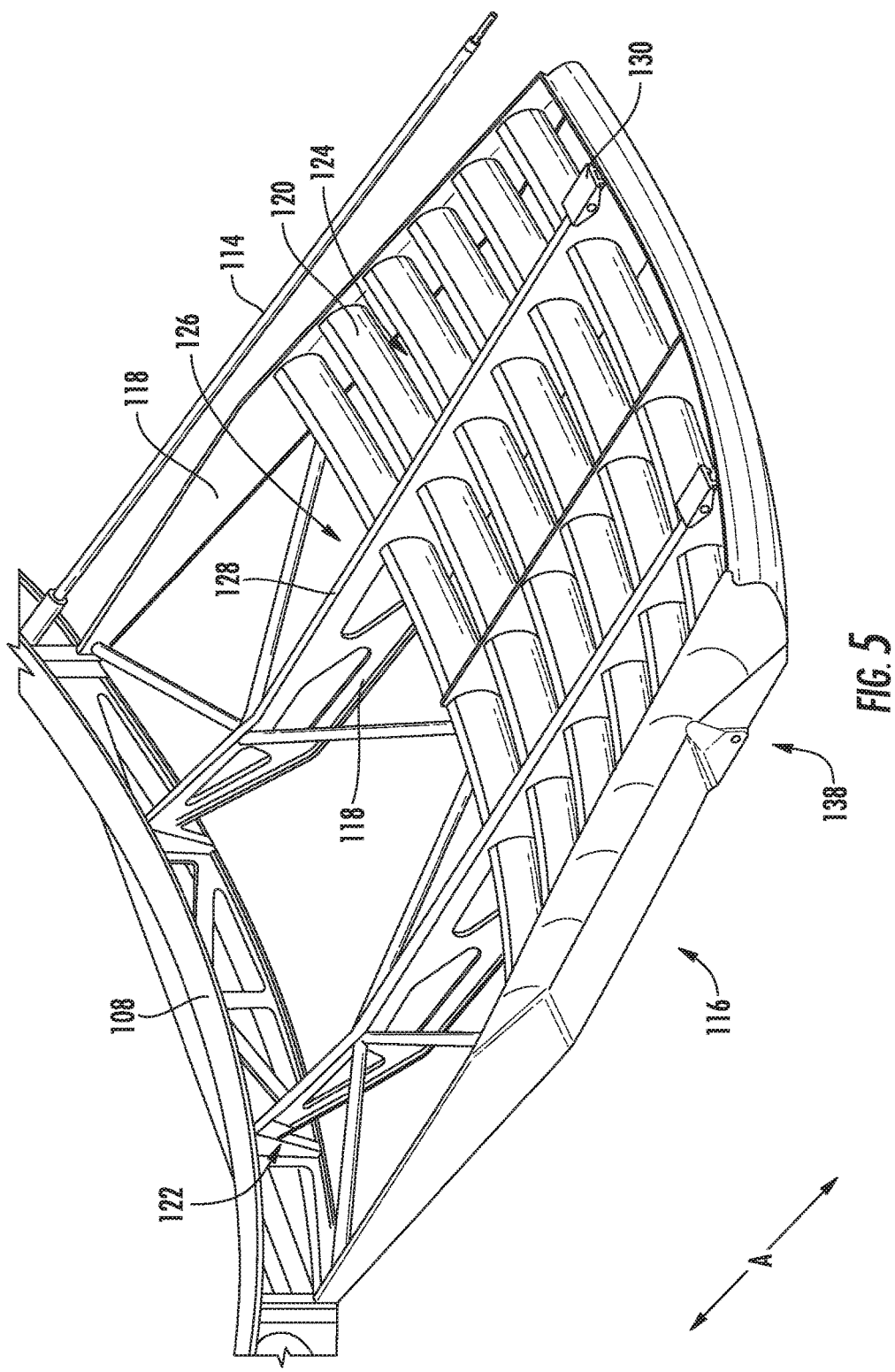
FIG. 5 is a perspective view of a cascade segment of the exemplary thrust reverser system of FIG. 2.

Referring now also to FIGS. 4 and 5, perspective views of certain components of the exemplary thrust reverser system 100 are provided. Specifically, FIG. 4 provides a perspective view of the forward ring 108 and cascade system 112, and FIG. 5 provides a perspective view of an individual cascade segment 116 of the cascade system 112. As is depicted in the Figures, the individual cascade segments 116 are generally circumferentially spaced around the core 16 of the turbofan engine 10. Additionally, each cascade segment 116 includes one or more axial frame members 118 and a plurality of individual cascades 120. For the embodiment depicted, each cascade segment 116 includes four axial frame members 118, each axial frame member 118 extending generally along an axial direction A of the turbofan engine 10. For the embodiment depicted, each of the axial frame members 118 are rotatably attached at a forward end 122 to the forward ring 108, such that each cascade segment 116 is pivotally, or rotatably attached at a forward end to the forward ring 108 of the thrust reverser system 100.

Additionally, for the embodiment depicted each cascade segment 116 includes a pair of outside axial frame members, and additionally includes two inside axial frame members. Attached to each axial frame member 118, the exemplary cascade segments 116 depicted include a plurality of individual cascades 120. Specifically, each axial frame member 118 includes approximately six cascades 120 axially aligned and attached to one or both sides. As will be discussed below, the individual cascades 120 each define a passage 124 (FIG. 5) configured to turn/redirect an airflow through the bypass passage 56 and generate a reverse thrust for the turbofan engine 10. It should be appreciated, however, that in other exemplary embodiments, each cascade segment 116 may include any suitable number/configuration of axial frame members 118 and individual cascades 120.

Figure 6:
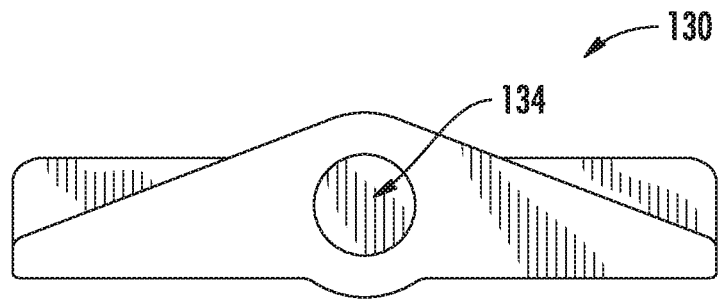
FIG. 6 is a side view of a slider of the exemplary thrust reverser system of FIG. 2 in accordance with an exemplary embodiment of the disclosure.
Figure 7:
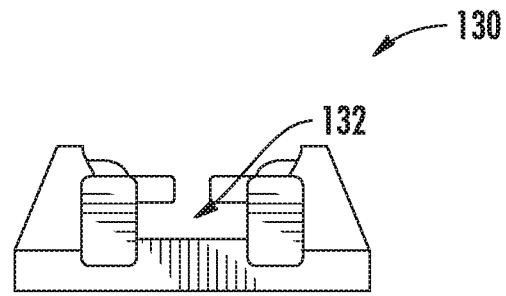
FIG. 7 is an end view of the exemplary slider of FIG. 6.
Figure 8:
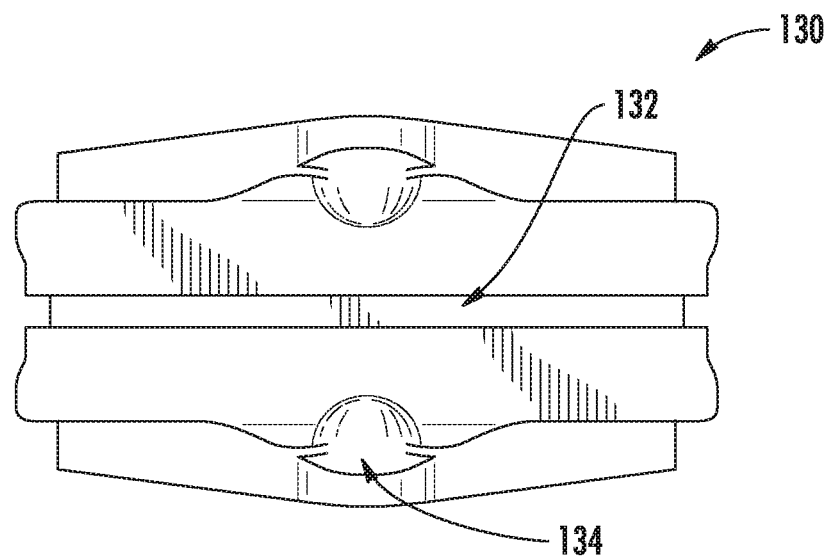
FIG. 8 is a top view of the exemplary slider of FIG. 6.

Moreover, a radially inner end 126 of one or more of the axial frame members 118 includes a track 128 extending along a length thereof. For the exemplary cascade segments 116 depicted, each of the two inner axial frame members include tracks 128 extending along the radially inner ends 126. Further, each cascade segment 116 includes a slider 130 that is slidably connected to the tracks 128 on the axial frame members 118 of the cascade segment 116. Additionally, for the embodiment depicted, the slider 130 is also rotatably attached to the frame member 110 of the thrust reverser system 100 (FIGS. 2 and 3). Referring now briefly to FIGS. 6 through 8, various views of a slider 130 in accordance with an exemplary embodiment present disclosure are provided. FIG. 6 provides a side view of the exemplary slider 130, FIG. 7 provides an end view of the exemplary slider 130, and FIG. 8 provides a top view of the exemplary slider 130.

As shown, the exemplary slider 130 defines a channel 132 extending along a length thereof configured to receive a correspondingly shaped portion of the track 128 and slide therealong. Additionally, the exemplary slider 130 includes openings 134 on opposing sides thereof for pivotally attaching the slider 130 to the frame member 110 of the thrust reverser system 100. It should be appreciated, however, that the exemplary slider 130 depicted in FIGS. 6 through 8 is provided by way of example only, and that in other exemplary embodiments, any other suitable slider 130 or slide mechanism may be provided to slidably attached the cascade segment 116 to the frame member 110. For example, in other exemplary embodiments, the radially inner ends 126 of one or more axial frame members 118 may define a channel, and the slider 130 may include a component slidably received therein.

Notably, the transcowl 106 of the thrust reverser system 100 is generally movable with the cascade system 112, or rather of the plurality of cascade segments 116. For example, as is depicted in FIGS. 2 and 3, each cascade segment 116 is pivotally connected to the transcowl 106 through one or more links 136. The one or more links 136 may be pivotally attached to the transcowl 106 at a base portion and also pivotally attached to a receiver 138 on the cascade segments 116 (see FIG. 4).

Additionally, for the embodiment depicted, the forward ring 108 is moved between the first position and a second position by one or more actuation assemblies 140. The exemplary actuation assemblies 140 depicted are positioned within the nacelle assembly 50. The actuation assemblies 140 can be of any suitable type and can be driven by, e.g., pneumatic, hydraulic, or electric motors. Moreover, the actuator assemblies 140 may be, for example, circumferentially spaced within the nacelle assembly 50.

Referring now back particularly to FIGS. 2 and 3, operation of the exemplary thrust reverser system 100 will be described. As is depicted schematically, the frame member 110 of the thrust reverser system 100 is mounted within the nacelle assembly 50, e.g., on the fan case located inward of the fan cowl 104. The frame member 110 is stationary relative to the fan cowl 104. By contrast, the forward ring 108 of the thrust reverser system 100 is movable along the axial centerline 12 of the turbofan engine 10 generally between a first position (FIG. 2) and a second position (FIG. 3). Accordingly, the forward ring 108 may be said to be movable along the axial centerline 12 relative to the frame member 110.

Additionally, the frame member 110 defines a fixed radius $R_1$ along the radial direction from the axial centerline 12 (FIG. 2). Similarly, the forward ring 108 also defines a fixed radius $R_2$ along the radial direction from the axial centerline 12 (FIG. 2). The radius $R_1$ of the frame member 110 refers to a distance along the radial direction R between the axial centerline 12 and a connection point with the cascade segments 116. Similarly, the radius $R_2$ of the forward ring 108 refers to a distance along the radial direction R between the axial centerline 12 and a connection point with the cascade segments 116. For the embodiment depicted, the fixed radius $R_2$ of the forward ring 108 is greater than the fixed radius $R_1$ of the frame member 110. Moreover, the exemplary cascade segments 116 have a geometry such that the tracks 128 defined at the radially inner ends 126 of the axially extending frame members 110 extend in a substantially straight line. Such a configuration allows for the thrust reverser system 100 to move between the fully stowed position of FIG. 2 (corresponding to the first position of the forward ring 108) and the fully deployed position of FIG. 2 (corresponding to the second position of the forward ring 108) by moving the forward ring 108 aftwardly along the axial direction A relative to the frame member 110. More specifically, as the forward ring 108 is moved aftwardly (i.e., closer to the frame member 110), the cascade segment 116 slides along its tracks 128 at the frame members 110. Simultaneously, given the mismatched radii $R_1$, $R_2$ of the frame member 110 and forward ring 108 (and/or an orientation of the tracks 128), a slope of the cascade segment 116 extending therebetween increases (relative to the axial centerline 12) as the forward ring 108 is moved closer to the frame member 110. Such a configuration causes the cascade segment 116 to be directed into the bypass passage 56 as the forward ring 108 is moved towards the frame member 110, such that once the forward ring 108 is moved into the second position (FIG. 3), the thrust reverser system 100 is in the fully deployed position.

It should be appreciated, however, that in other exemplary embodiments, the thrust reverser system 100 may have any other suitably configuration for deploying a cascade system 112 by moving a forward ring 108 relative to a frame member 110. For example, referring to FIGS. 9 and 10, a simplified schematic view of a thrust reverser system 100 in accordance with another exemplary embodiment in a fully stowed position and a fully deployed position, respectively, is provided. Except as described below, the thrust reverser system 100 of FIGS. 9 and 10 may be configured in a substantially similar manner as the exemplary thrust reverser system 100 of FIGS. 2 and 3, and accordingly the same or similar numbering may refer to the same or similar part. For the embodiment depicted, the forward ring 108 may define a fixed radius $R_2$ that is substantially the same, or even less than, a fixed radius $R_1$ of the frame member 110. However, with such an embodiment, the cascade segments 116 may define a geometry that provides for the desired deployment operation. Specifically, the exemplary cascade segment 116 depicted includes a bend at a radially inner end 126 such that the track 128 positioned on the radially inner end 126 of the axial frame member 118 is sloped inwardly towards the frame member 110 as the track 128 approaches the frame member 110. Such a configuration allows for the thrust reverser system 100 to operate in the same manner described above with reference to FIGS. 2 and 3.

A gas turbine engine including a thrust reverser system in accordance with one or more embodiments of the present disclosure may allow for a more undisturbed flow of air through the bypass passage when the thrust reverser system is in the fully stowed position. For example, a gas turbine engine including a thrust reverser system in accordance with one or more embodiments of the present disclosure may allow for the thrust reverser system to be deployed using one or more components that are enclosed completely within the nacelle assembly when in the fully stowed position. Further, inclusion of a thrust reverser system in accordance with one or more embodiments of the present disclosure may provide for a relatively well controlled airflow (as compared to a traditional fixed cascade system with blocker doors having relatively large regions of unsteady, separated flow).

Figure 11:
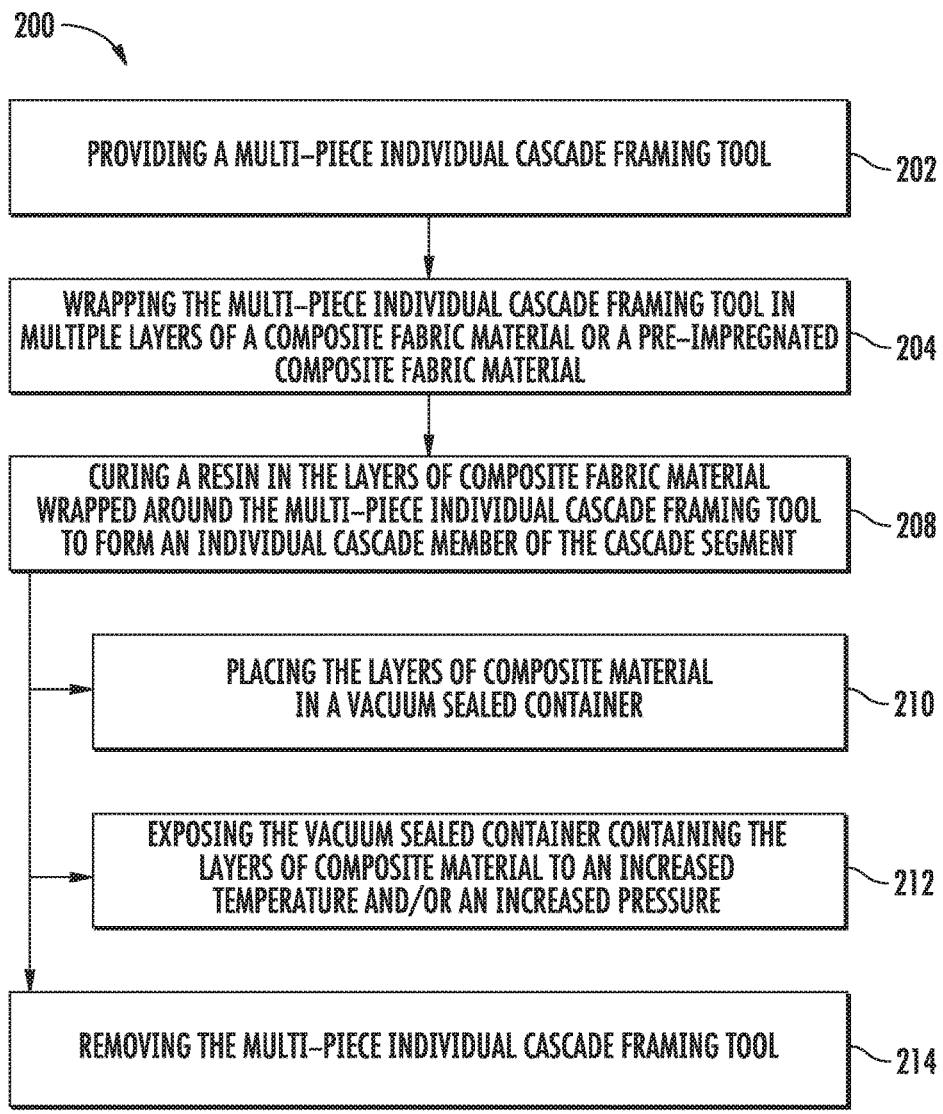
FIG. 11 is a flow diagram of a method for manufacturing a cascade segment of a thrust reverser system in accordance with an exemplary aspect of the present disclosure.

Referring now to FIG. 11, a flow diagram is provided of an exemplary method (200) for manufacturing a cascade segment of a thrust reverser system for incorporation into a nacelle assembly of a gas turbine engine. The exemplary thrust reverser system referred to in FIG. 11 may be configured in substantially the same manner as one or more of the exemplary cascade segments 116 described above with reference to FIGS. 2 and 3.

The exemplary method (200) includes at (202) providing a multi-piece individual cascade framing tool. The multi-piece individual cascade framing tool provided at (202) may generally have a desired shape for a passage to be defined by an individual cascade of the cascade segment. Further, the multi-piece individual cascade framing tool provided at (202) may be a split tool configured to expand to the desired shape for the passage during formation of the individual cascade and retract to a smaller shape, e.g., after formation of the individual cascade.

The exemplary method (200) additionally includes at (204) wrapping the multi-piece individual cascade framing tool in multiple layers of a composite fabric or "pre-preg" composite fabric material. For example, the composite fabric material may be graphite composite material, or alternatively may be any other suitable composite fabric material. Additionally, the pre-preg material, also known as a pre-impregnated material, may include a composite fabric having a matrix material, such as epoxy, already present. Notably, wrapping the multi-piece framing tool at (204) may include wrapping at least three layers of composite fabric material or pre-preg material around the framing tool and smoothing out any wrinkles in the fabric around a plurality of edges of the multi-piece framing tool to ensure no wrinkles or creases are present during formation.

The exemplary method (200) may additionally include resin impregnating the multiple layers of composite fabric material wrapped around the multi-piece individual cascade framing tool. The resin may be an epoxy resin material, or alternatively may be any other suitable resin material. Notably, resin impregnating the composite fabric material may not be necessary when pre-impregnated material is used.

The method (200) further includes at (208) curing the resin impregnated layers of composite fabric material wrapped around the multi-piece individual cascade framing tool to form an individual cascade member of the cascade segment. For the exemplary aspect depicted, curing the resin impregnated layers of composite fabric material at (208) includes at (210) placing the resin impregnated layers of composite material in a vacuum sealed container, such as a vacuum bag, and at (212) exposing the vacuum sealed container containing the resin impregnated layers of composite material to an increased temperature and/or an increased pressure. For example, exposing the vacuum sealed container containing the resin impregnated layers of composite material to an increased temperature and or an increased pressure at (212) may include positioning the vacuum sealed container and contents into an autoclave device.

Figure 12:
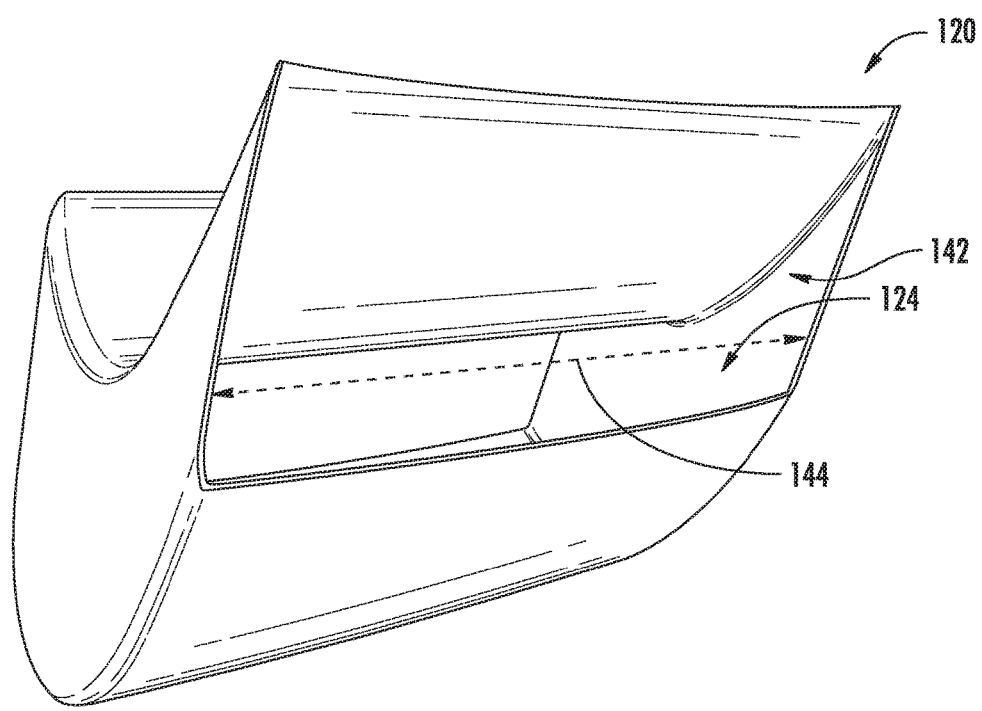
FIG. 12 is a perspective view of an individual cascade segment manufactured according to the exemplary method of FIG. 11.

Referring still to FIG. 11, the exemplary method further includes at (214) removing the multi-piece individual cascade framing tool. Referring now to FIG. 12, a perspective view of an individual cascade 120 formed according to the exemplary method (200) of FIG. 11 is provided. The resulting individual cascade 120 defines one or more interior edges 142 and a passage 124 having a passage width 144 where the multi-piece individual cascade framing tool was removed. The one or more interior edges 142 define a radius of curvature between about three percent of the passage width 144 and about thirty percent of the passage width 144. For example, in certain exemplary aspects the one or more interior edges may define a radius of curvature between about eight percent of the passage width 144 and about fifteen percent of the passage width 144. Such a configuration may result in an individual cascade 120 having a desired amount of strength for generating reverse thrust when incorporated into a thrust reverser system.

Although not depicted in FIG. 11, the method may additionally include attaching a plurality of individual cascades together and also to an axial frame member to form the cascade segment.

It should be appreciated, however, that the exemplary method (200) described above with reference to FIG. 11, is provided by way of example only, and that in other exemplary aspects, cascade segments for a thrust reverser system in accordance with one or more embodiments the present disclosure may be formed in any other suitable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial centerline, the gas turbine engine comprising:
    a core in flow communication with a fan; and
    a nacelle assembly enclosing the fan and at least a portion of the core to define a bypass passage with the core, the nacelle assembly comprising a thrust reverser system, and the thrust reverser system comprising
    a frame member;
    a forward ring movable along the axial centerline relative to the frame member between a first position and a second position;
    a cascade segment slidably attached to the frame member and rotatably attached to the forward ring such that when the forward ring is in the first position the cascade segment is positioned outside the bypass passage and when the forward ring is in the second position the cascade segment is positioned at least partially within the bypass passage; and
    wherein the gas turbine engine further defines a radial direction, wherein the frame member defines a fixed radius along the radial direction from the axial centerline, wherein the forward ring defines a fixed radius along the radial direction from the axial centerline, and wherein the fixed radius of the forward ring is greater than the fixed radius of the frame member.

2. The gas turbine engine of claim 1, wherein the thrust reverser system further includes a transcowl, wherein the transcowl is movable with the forward ring and cascade segment.

3. The gas turbine engine of claim 2, wherein the cascade segment is pivotally connected to the transcowl through one or more links.

4. The gas turbine engine of claim 1, wherein the first position of the forward ring corresponds to a fully stowed position of the thrust reverser system, and wherein the second position of the forward ring corresponds to a fully deployed position of the thrust reverser system.

5. The gas turbine engine of claim 1, wherein the forward ring is moved between the first position and the second position by one or more actuation assemblies.

6. The gas turbine engine of claim 1, wherein the nacelle assembly further includes a fan cowl, and wherein the frame member of the thrust reverser system is stationary relative to the fan cowl.

7. The gas turbine engine of claim 1, wherein the thrust reverser system further includes a plurality of axially extending tracks, and wherein the forward ring is slidable along the plurality of axially extending tracks.

8. A gas turbine engine defining an axial centerline, the gas turbine engine comprising:
- a core in flow communication with a fan; and
- a nacelle assembly enclosing the fan and at least a portion of the core to define a bypass passage with the core, the nacelle assembly comprising a thrust reverser system, and the thrust reverser system comprising
- a frame member;
- a forward ring movable along the axial centerline relative to the frame member between a first position and a second position;
- a cascade segment slidably attached to the frame member and rotatably attached to the forward ring such that when the forward ring is in the first position the cascade segment is positioned outside the bypass passage and when the forward ring is in the second position the cascade segment is positioned at least partially within the bypass passage; and
- wherein the cascade segment includes an axial frame and a slider, wherein the slider is slidably connected to the axial frame, and wherein the slider is rotatably attached to the frame member of the cascade segment.

9. The gas turbine engine of claim 1, wherein the cascade segment is formed of a composite resin material, and wherein the forward ring is formed of aluminum.

10. A thrust reverser system for incorporation into a nacelle assembly for a gas turbine engine, the thrust reverser system comprising:
- a frame member;
- a forward ring movable along an axial centerline relative to the frame member between a first position and a second position;
- a cascade segment slidably attached to the frame member and rotatably attached to the forward ring such that when the forward ring is in the first position the cascade segment is in a radially outer position and when the forward ring is in the second position the cascade segment is in a radially inner position; and
- wherein the frame member defines a fixed radius, wherein the forward ring defines a fixed radius, and wherein the fixed radius of the forward ring is greater than the fixed radius of the frame member.

11. The thrust reverser system of claim 10, wherein the first position of the forward ring corresponds to a fully stowed position of the thrust reverser system, and wherein the second position of the forward ring corresponds to a fully deployed position of the thrust reverser system.

12. The thrust reverser system of claim 10, wherein the forward ring is moved between the first position and the second position by one or more actuation assemblies.

13. The thrust reverser system of claim 10, wherein the thrust reverser system further includes a plurality of axially extending tracks, and wherein the forward ring is slidable along the plurality of axially extending tracks.

14. The gas turbine engine of claim 8, wherein the thrust reverser system further includes a transcowl, wherein the transcowl is movable with the forward ring and cascade segment.

15. The gas turbine engine of claim 14, wherein the cascade segment is pivotally connected to the transcowl through one or more links.

16. The gas turbine engine of claim 8, wherein the first position of the forward ring corresponds to a fully stowed position of the thrust reverser system, and wherein the second position of the forward ring corresponds to a fully deployed position of the thrust reverser system.

17. The gas turbine engine of claim 8, wherein the forward ring is moved between the first position and the second position by one or more actuation assemblies.

18. The gas turbine engine of claim 8, wherein the nacelle assembly further includes a fan cowl, and wherein the frame member of the thrust reverser system is stationary relative to the fan cowl.

19. The gas turbine engine of claim 8, wherein the thrust reverser system further includes a plurality of axially extending tracks, and wherein the forward ring is slidable along the plurality of axially extending tracks.

20. The gas turbine engine of claim 8, wherein the cascade segment is formed of a composite resin material, and wherein the forward ring is formed of aluminum.

* * * * *